July 27, 1937.  A. Y. DODGE  2,087,968
CLUTCH
Filed March 14, 1932  2 Sheets-Sheet 1
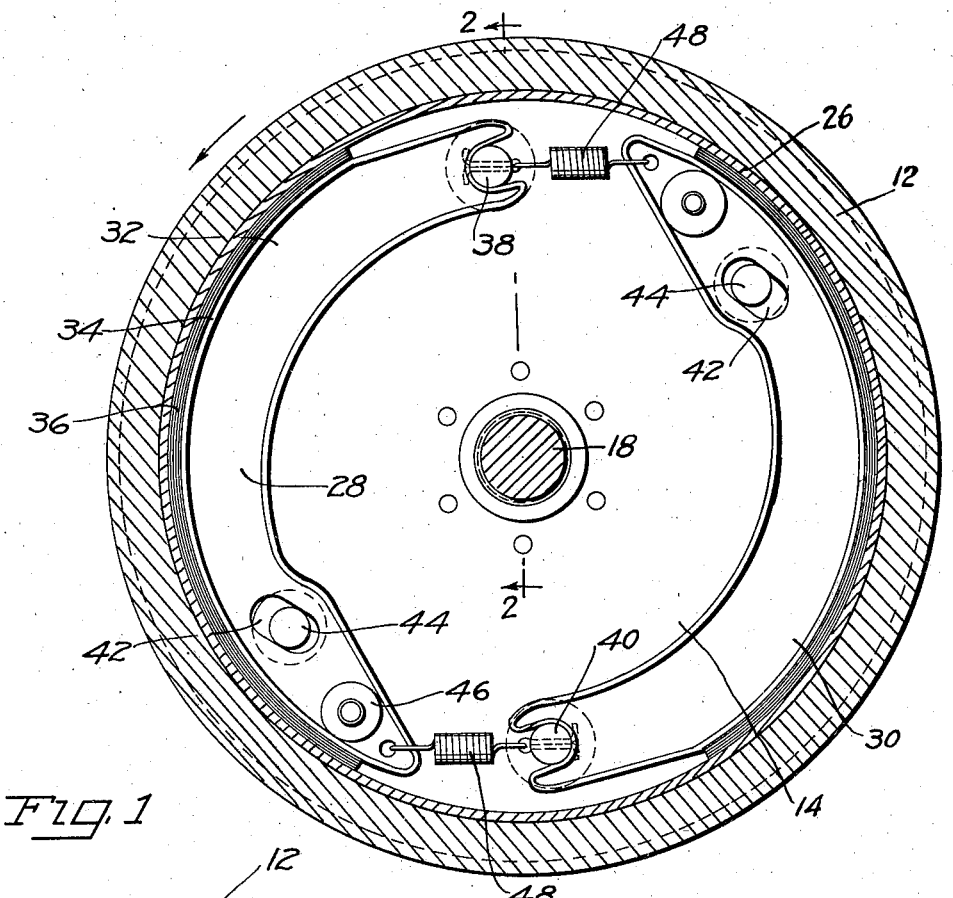
Fig. 1
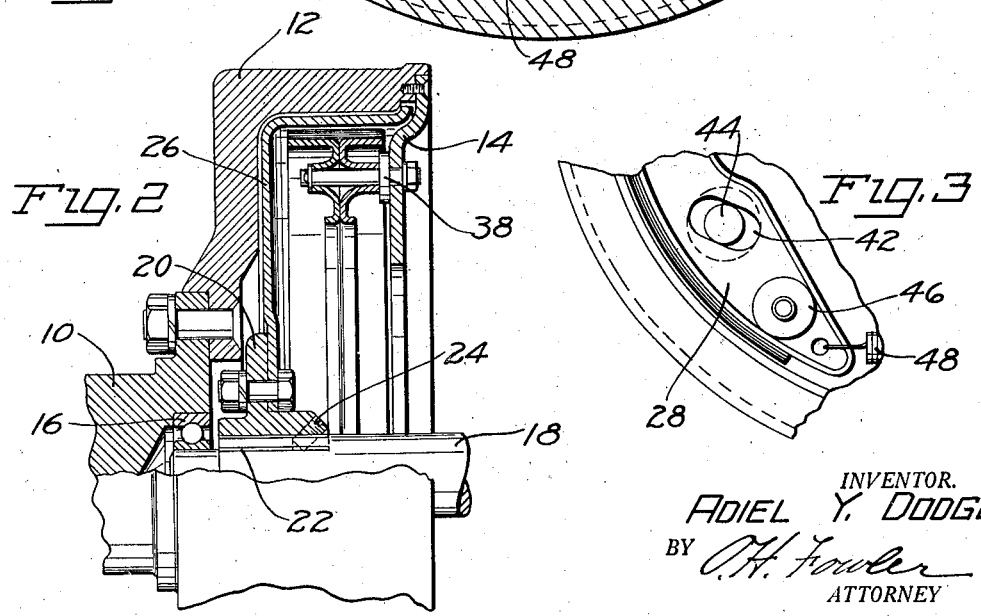
Fig. 2
Fig. 3
INVENTOR.
ADIEL Y. DODGE
BY
ATTORNEY July 27, 1937.   A. Y. DODGE   2,087,968
CLUTCH
Filed March 14, 1932   2 Sheets-Sheet 2

INVENTOR.
ADIEL Y. DODGE
BY O. H. Fowler
ATTORNEY

Patented July 27, 1937

2,087,968

UNITED STATES PATENT OFFICE 2,087,968

CLUTCH

Adiel Y. Dodge, South Bend, Ind., assignor to Bendix Aviation Corporation, South Bend, Ind., a corporation of Delaware Application March 14, 1932, Serial No. 598,855

4 Claims. (Cl. 192—105)

This invention relates to clutches.

An object of the invention is to provide a clutch mechanism in which a servo clutch shoe rotates with the fly wheel secured to the driving shaft of a prime mover.

Another object of the invention is to provide a clutch mechanism in which a clutch shoe rotates with the fly wheel of a prime mover, and in which centrifugal force assists in applying the clutch shoes.

Another object of the invention is to provide a clutch of the class described, in which operation of the clutch is entirely automatic, and in which the shoes may be caused to disengage at a speed below a predetermined maximum centrifugal force.

A further object of the invention is to provide a clutch mechanism including means for assisting in the actuation of the clutch shoes for disengagement when the work overruns the flying wheel.

With these objects in view and such others as may hereinafter appear, the invention includes various details of structure which will be apparent from the following description of the illustrated embodiments shown in the accompanying drawings, in which:

Figure 1 is a vertical sectional view illustrating the clutch shoes in elevation;

Figure 2 is a side elevation partly in section and partly broken away; and

Figure 3 is a detail view of one of the clutch shoes.

Figure 4:
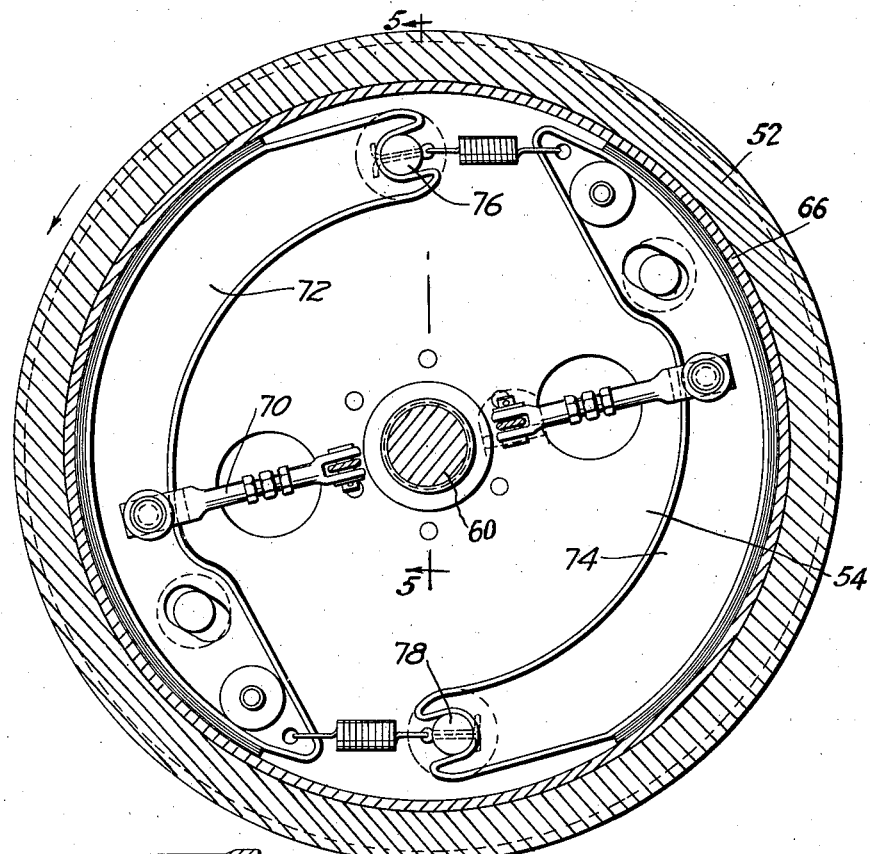
Figure 5:
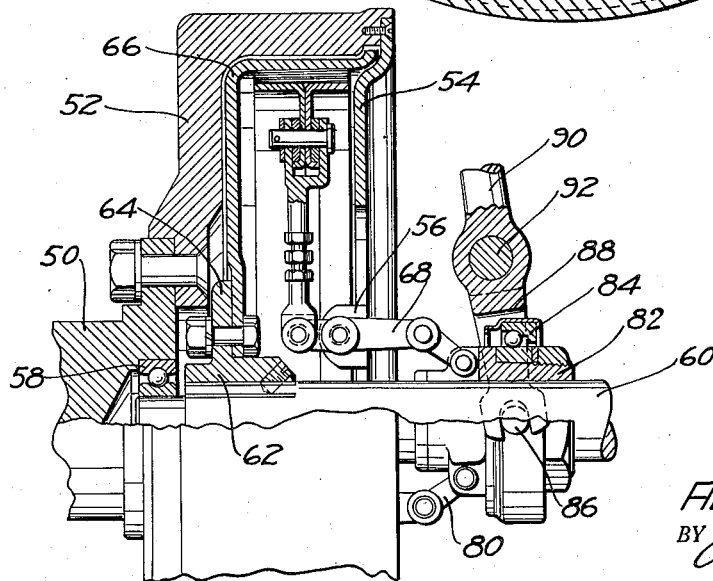

Referring to the drawings for more specific details of the invention, 10 represents the driving shaft of a prime mover, not shown. This shaft has bolted or otherwise secured thereto a fly wheel 12 rotatable in a counter clockwise direction as indicated by the arrow disclosed in Figure 1. The latter member has suitably secured to the flange thereof a dust shield or backing plate 14, which may be of any preferred type.

Journalled in one end of the driving shaft in suitable bearings 16 is a driven shaft 18. This shaft has positioned thereon a collar 20. As shown, the collar is splined to the shaft as indicated at 22 and secured against axial movement by a set screw 24. Bolted or otherwise secured to the collar is a drum 26 arranged within the fly wheel concentrically thereto, and in spaced relation, so that rotation between the drum and the fly wheel may be affected without these parts engaging one another.

The backing plate 14 has positioned thereon corresponding and interchangeable clutch shoes 28 and 30. Each of the shoes includes a web 32, supporting a rim 34, to which is suitably secured lining 36 adaptable for cooperation with the clutching surface of the drum. As shown, the shoes 28 and 30 are anchored on the backing plate as indicated at 38 and 40.

The toes of the shoes are provided with suitable openings 42 adaptable for the reception of fixed pins 44, arranged on the backing plate. The openings 42 are so arranged with respect to the pins 44 that upon engagement of the shoes with the clutching surface of the drum said shoes are permitted to wedge into drum engagement. Each shoe has suitably secured to the toe thereof a weight 46, and connecting the toe of each shoe to the anchor for the other shoe; are returning springs 48.

In this structure the shoes rotate with the fly wheel and are moved into drum engagement by the centrifugal force due to rotation. The movement of the shoes is entirely automatic and is augmented to a greater or lesser degree according to the size of the weights 46 and the tension of the springs 48. Under the action of the rotating fly wheel the shoes move outwardly fulcruming about the anchors 38 as pivots, this movement being counteracted by the action of the return springs 48, which act to rotate the shoes about the fixed pins 44 as pivots. It is, of course, to be understood that the springs serve to disengage the shoes at or below a certain speed of the fly wheel.

It is also, to be understood that the automatic release of the shoes is likewise determined by the centrifugal force imparted to the shoes by reason of their rotating with the fly wheel, and that this force is also controlled to a greater or less degree by the tension of the springs.

While preferred embodiments of the invention have been described, it is to be understood that these are given merely as examples of the underlying principles of the invention, and since these may be incorporated in other specific mechanical structures, I do not intend to be limited to those shown except as such limitations are clearly imposed by the appended claims.

Having thus described the various features of the invention, what I claim as new and desire to secure by Letters Patent, is:

1. A clutch comprising relatively movable parts, anchors on one of the parts; shoes pivoted on the anchors and movable by centrifugal force into engagement with the other part, yielding means resisting the centrifugal force, and means on the toes of the shoes for aiding the centrifugal force.

2. A clutch comprising a driving shaft, a hollow fly wheel secured thereto, a driven shaft, a drum carried thereby positioned concentrically in the hollow fly wheel, a plate secured to the fly wheel, friction members anchored on the plate and movable by centrifugal force into engagement with the drum.

3. A clutch comprising a driving shaft, a hollow fly wheel thereon, a driven shaft, a drum carried by the driven shaft nested in the hollow fly wheel, a plate secured to the fly wheel, friction members anchored on the plate and movable by centrifugal force into drum engagement, and yielding means connecting the friction members to the anchors.

4. A clutch comprising a driving shaft, a hollow fly wheel secured thereto, a dust shield secured to a flange of the fly wheel, a driven shaft having one end journalled coaxially in the driving shaft, a collar splined on the driven shaft, a drum supported by the collar co-axially within the fly wheel, anchors on the dust shield, friction elements pivoted on the anchors and movable by centrifugal force into drum engagement, weights on the friction elements and springs yielding, resisting the centrifugal force imparted to the friction elements.

ADIEL Y. DODGE.